United States Patent [19]

Kita et al.

[11] Patent Number: 4,895,049
[45] Date of Patent: Jan. 23, 1990

[54] STEPLESS SPEED REDUCER

[75] Inventors: Yasuo Kita; Yoshihiko Nakakoji, both of Kyoto, Japan

[73] Assignee: Shimadzu Corporation, Kyoto, Japan

[21] Appl. No.: 226,485

[22] Filed: Aug. 1, 1988

[30] Foreign Application Priority Data

Jul. 31, 1987 [JP] Japan .................. 62-335665

[51] Int. Cl.⁴ ............................................. F16H 47/04
[52] U.S. Cl. ........................................ 74/687; 74/720
[58] Field of Search ................. 74/687, 731, 732, 733, 74/718, 720

[56] References Cited

U.S. PATENT DOCUMENTS

| | | |
|---|---|---|
| 3,709,061 | 1/1973 | Orshansky, Jr. ................ 74/687 |
| 3,897,697 | 8/1975 | Chambers et al. ............ 74/687 X |
| 3,969,958 | 7/1976 | Miyao et al. .................... 74/687 |
| 3,988,949 | 11/1976 | Weseloh et al. ................ 74/687 |
| 3,990,327 | 11/1976 | Margolin ..................... 74/720 X |
| 4,184,385 | 1/1980 | Maeda .......................... 74/687 |
| 4,261,226 | 4/1981 | Orshansky, Jr. et al. ........ 74/687 |
| 4,286,477 | 9/1981 | Meyerle et al. ................ 74/687 |
| 4,304,151 | 12/1981 | Meyerle et al. ................ 74/687 |
| 4,750,381 | 6/1988 | Kita et al. .................... 74/687 |
| 4,776,233 | 10/1988 | Kita et al. .................... 74/687 |

FOREIGN PATENT DOCUMENTS 0195452  9/1986  European Pat. Off. .......... 74/687

Primary Examiner—Leslie A. Braun
Assistant Examiner—William Gehris
Attorney, Agent, or Firm—Armstrong, Nikaido, Marmelstein, Kubovcik & Murray

[57] ABSTRACT

A stepless speed reducer includes the mechanical power transmission lines for high speed and low speed, the two lines being selectively concluded to effect power transmission. When the working speed ratio comes near a predetermined critical speed ratio, the operation is maintained at the critical speed ratio while the pump motor for low speed is kept inoperative and no pressure difference exists between the transmission circuits, thereby transmitting power through the line for high speed.

5 Claims, 3 Drawing Sheets

STEPLESS SPEED REDUCER

BACKGROUND AND SUMMARY OF THE INVENTION

The present invention relates to a stepless speed reducer versatile for machines and vehicles.

Hydraulic stepless speed reducers, commonly called a hydrostatic speed transmission (HST), are known in the art and widely used, which employs a fluid pump motor. This type of speed reducer is excellent in changing speeds, but disadvantageously, it consumes energy, and is limited to a relatively small range of variable speeds. In order to improve the known HST speed reducers, a differential gearing is used to share the power transmission with the HST mechanism. The new system is introduced in "Hydraulic Engineering" by Tomoo Ishihara (Publisher: Asakura Shobo), and "Theory and Practice of Piston Pump Motors" by Sadao Ishihara (Publisher: Corona Co.).

The known stepless speed reducer having a differential gearing includes a first mechanical transmission line for low speed between a first and second input/output shaft ends (hereinafter referred to merely as "ends", and a second mechanical transmission line for high speed between the first and a third input/output ends. A hydraulic pump motor is connected to the second input/output end at one end thereof, and to the third input/output end at the other end. The first mechanical transmission line includes a first clutch for placing its transmission end in engagement or disengagement with a rotor, and the second mechanical transmission line includes a second clutch for placing its transmission end in engagement or disengagement with the same rotor. The two clutches are alternatively turned on, thereby selectively concluding a high speed transmission line or a low speed transmission line. The stepless speed reducer having a differential gearing is operated in the following manner:

Now, suppose that the HST transmission is employed in a vehicle. The speed ratio (output rotating speed/input rotating speed) of the both transmission lines must be controlled so that the engine may not rotate at a higher speed beyond the rate of fuel supplied to the engine. When the vehicle is driven at a slightly lower speed ratio than an intermediate speed ratio at which the first and second transmission ends are rotated at an equal speed, the first clutch is selected and prepared for connection. When the speed ratio increases and reaches the intermediate speed, the first clutch is disengaged whereas the second clutch is engaged, thereby shifting the low speed mode into the high speed mode. When the high speed mode is to be shifted into the low speed mode, the second clutch is selected and prepared for connection.

In general, a hydraulic power transmission is less efficient than the mechanical power transmission; in particular, it is inefficient when it is used for the whole range of higher speeds.

In order to overcome the problem described above, a new system has been proposed, which uses the mechanical transmission line exclusively for the high speed range while the hydraulic line is kept inoperative. In this new system a maximum speed ratio is predetermined so that when the speed ratio in the high speed mode exceeds it, the hydraulic transmission line is kept inoperative, and when the speed ratio becomes lower than the maximum speed ratio, the hydraulic transmission line is put into operation. Herein, a disadvantage arises that while the vehicle is running, the speed ratio unavoidably fluctuates around the predetermined maximum speed ratio. This fluctuation of speed ratio continually turns on and off the clutches so that they are liable to quick fatigue. Another disadvantage is a shortened life of the fluid pump motor due to the act that they are constantly subjected to differential pressure remaining in the fluid circuits.

The present invention aims at eliminating the disadvantages pointed out above, and has for its object to provide an improved stepless speed reducer.

According to the present invention, there is provided a stepless speed reducer which includes the mechanical power transmission lines for high speed and low speed, the two lines being selectively concluded to effect power transmission, wherein if the working speed ratio comes near a predetermined critical speed ratio, the operation is maintained at the critical speed ratio while the pump motor for low speed is kept inoperative and no pressure difference exists between the transmission circuits, thereby transmitting power through the line for high speed.

DETAILED DESCRIPTION OF THE INVENTION

Figure 1:
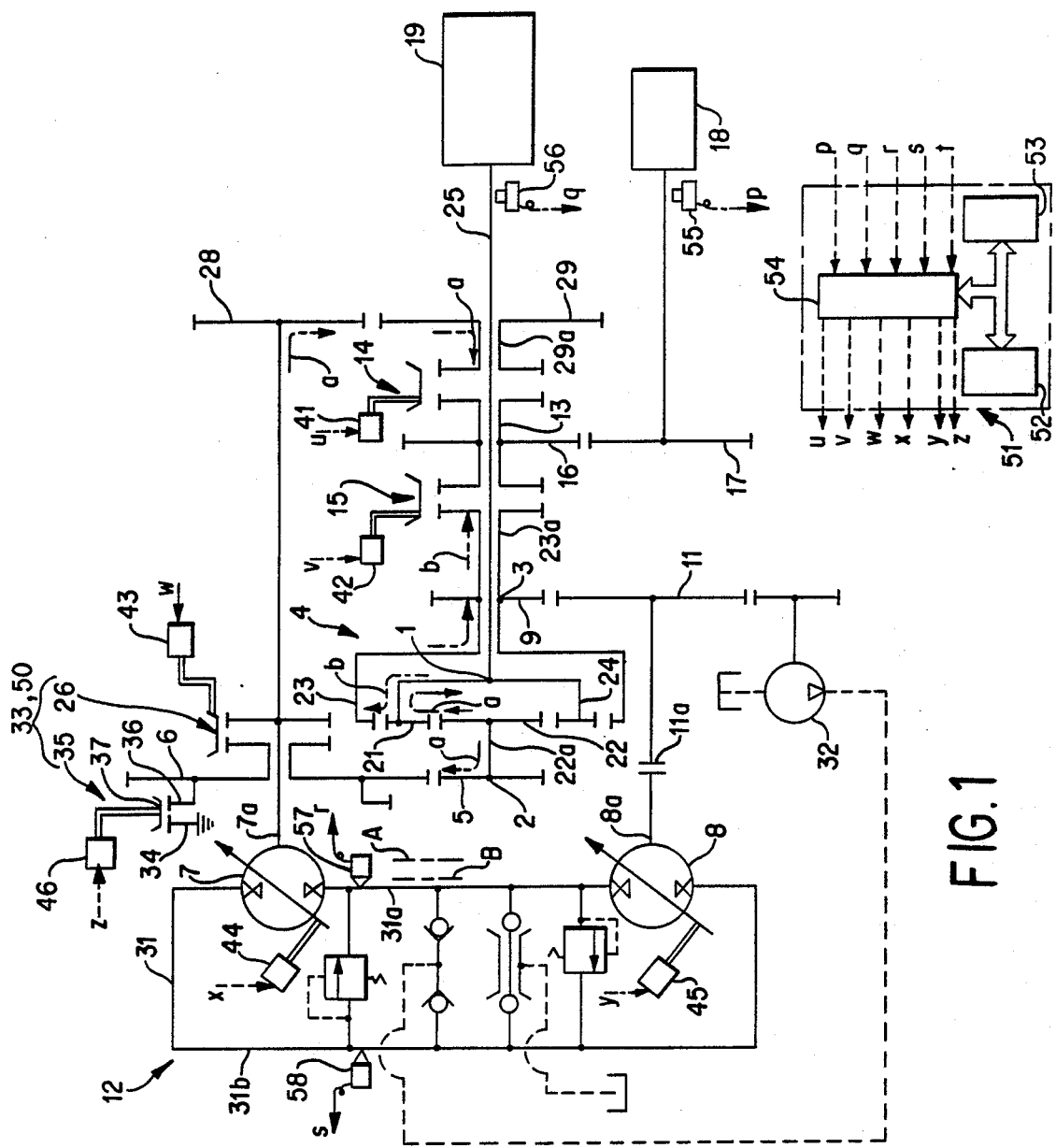
FIG. 1 is a block diagram showing hydraulic flow paths in the stepless speed reducer according to the present invention.

Referring to FIG. 1 the stepless speed reducer of the invention includes a first, a second and a third input/output end 1, 2 and 3, respectively. There is provided a differential gear unit 4 which has a mechanical transmission line (a) for low speeds between the first and second input/output end 1 and 2, and a mechanical transmission line (b) for high speeds (b) between the first and the third input/output end 1 and 3. There are provided a first pump motor 7 which has its shaft end 7a connected to the second input/output end 2 through gears 5, 6, and a second pump motor 8 which has its shaft end 8a connected to the third input/output end 3 through gears 9, 11. The two motors 7 and 8 supply fluids to fluid transmission mains (A) and (B) in a fluid transmission unit 12. An end of the low-speed side transmission line (a) is engageable with a rotary center boss 13 by means of a clutch 14. An end of the high-speed side transmission line (b) is engageable with the center boss 13 by means of a clutch 15. The center boss 13 is connected to an output shaft end 18 through gears 16 and 17.

The differential gear unit 4 comprises planetary gears 21 located along an orbit, a sun gear 22 located in the center of the orbit, and a ring gear 23 located outside the orbit. The differential gear unit 4 has a gear retainer 24 which has the input/output end 1 at its center. An input shaft 25 is provided at the input/output end 1 connected to a source of power 19. The sun gear 22 has its supporting shaft 22a whose end constitutes the input/output end 2 to which the gear 5 is fixed. The ring gear 23 has a boss 23a whose end constitutes the third input/output end 3 to which the gear 9 is fixed.

In addition to the planetary gears 21, the sun gear 22, the gears 5, 6, the low-speed side mechanical transmission line (a) includes a clutch 26 and gears 28, 29, the last-mentioned gear 29 having a boss 29a which functions as a transmission end. The high-speed side transmission line (b) includes the planetary gears 21 and the ring gear 23, the ring gear 23 having a boss 23a which functions as a transmission end.

The pump motors 7 and 8 included in the fluid transmission unit 12 each capable of varying capacities are connected in series to each other through a hydraulic path 31. The motor 7 has an input/output shaft 7a connected to a supporting shaft 22a of the sun gear 22 through the gears 5, 6. The motor 8 has an input/output 8a connected to the ring gear 23 through the gears 9, 11. The reference numeral 32 denotes a booster pump provided in the fluid path 31.

There is provided a changeover member 33 between the second input/output end 2 and the pump motor 7, so as to change the direction of output. The changeover member 33 has its gear 6 connected to the shaft end 7a of the motor 7 through the clutch 26, and has a lock-up clutch 35 between the gear 6 and a fixture 34. The clutch 26 is disengaged when the vehicle runs backward, and as its name implies, it is engaged with the fluid path when the vehicle runs forward. The lock-up clutch 35 locks the second input/output end 2 from rotation when the vehicle is to run backward, and also locks the shaft end 7a of the pump motor 7 in the top-lock-up mode, thereby enabling the shaft end 7a to be engaged or disengaged with the fixing member 34. The lock-up clutch 35 includes a ratchet wheel 36, a ratchet 37 pivotally supported on the fixing member 34 and an actuator 46 for placing the ratcjhet 37 into engagement with the ratchet wheel 36. When the vehicle runs forward at a low speed, the lock-up clutch 35 is free from the gear 6, and when the vehicle runs in the top-lock-up mode, or when it runs backward, the clutch 35 locks the gear 6 so as to prevent the second input/output end 2 from rotation. As evident from the foregoing, the lock-up clutch 35 plays an important role in a power distribution stop unit 50. The clutches 14, 15 and 26 are actuated by actuators 14, 15 and 26, respectively.

There are provided another actuators 44 and 45, which are designed to vary a capacity displaceable in the pump motor 7. Hereinafter this capacity will be referred to as "displacement". The actuators 44 and 45 are controlled by a computer 51.

The computer 51 includes a central processing unit (CPU) 52, memories 53 and an interface 54. The interface 54 receives various signals; that is, a signal (p) from a first sensor 55 for detecting an output rotating speed, a signal (q) from a second sensor 56 for detecting an input rotating speed, a signal (r) from a first pressure sensor 57 provided in that circuit part 31a of a fluid pressure main 31 which becomes high in the low speed mode, a signal (s) from a second pressure sensor 58 provided in that circuit part 31b of the main 31 which becomes high in the high speed mode, and a signal (t) indicating the amount of fuel supply to the engine 19 to control the output thereof. The interface 45 generates various signals; that is, a signal (u) for operating the actuator 41 for the low-speed clutch 14, a signal (v) for operating the actuator 42 for the high-speed clutch 15, a signal (w) for operating the actuator 43, signals (x) and (y) for operating the actuators 44 and 45, respectively, and a signal (z) for operating the actuator 46.

Figure 2A:
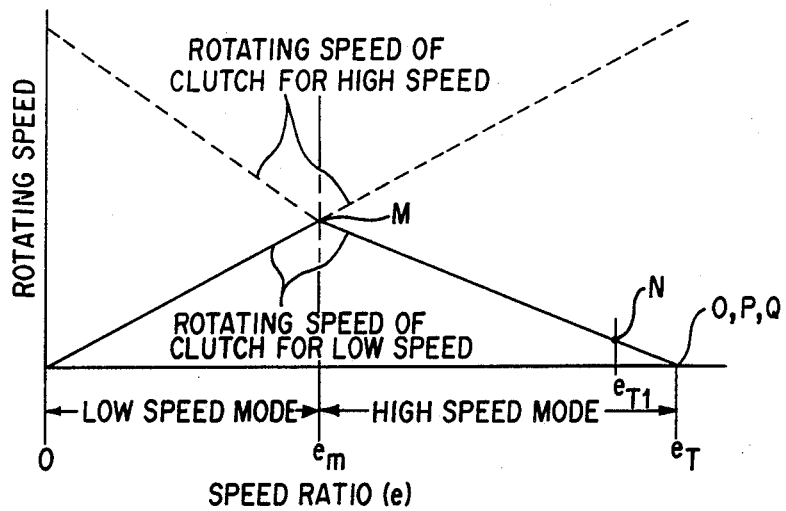
FIGS. 2a, 2b and 2c are graphic diagrams showing modes in which the pump motors are controlled.
Figure 2B:
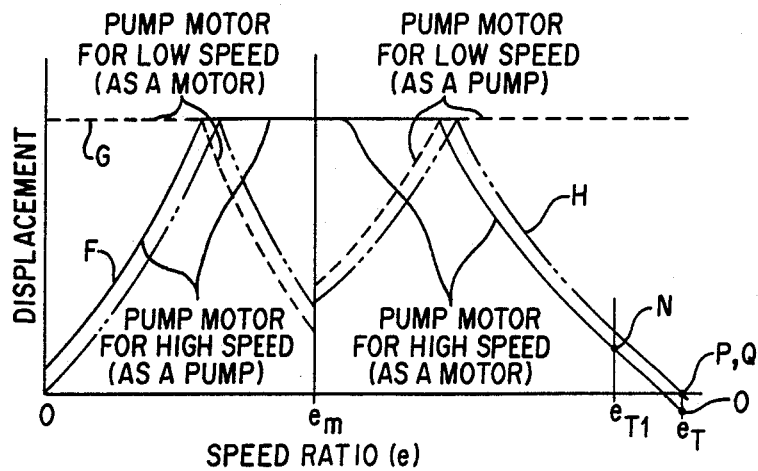
Figure 3:
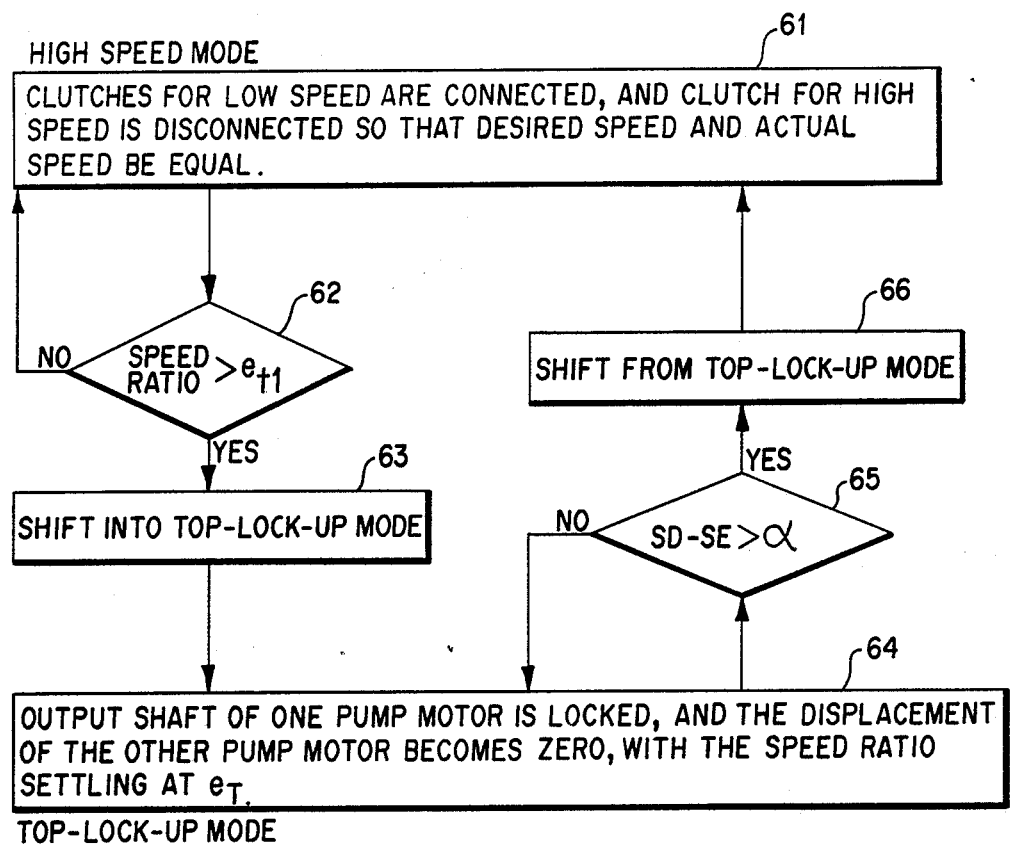
FIG. 3 is a flow chart showing a manner of controlling the pump motors.

The memory 53 stores programs, such as the program shown in FIG. 2(b) for shifting from the high speed to the low speed mode or vice versa, and the program shown in FIG. 3 for carrying out the present invention.

Taking an example for a vehicle which runs forward, the operation of the stepless speed reducer will be described:

In a driving area in which the speed ratio (e) (output rotating speed/input rotating speed) is below a predetermined intermediate speed ratio ($e_m$), the low speed mode is selected by engaging the clutch 14 for low speed and disengaging the clutch 15 for high speed. More specifically, the speed ratio (e) is consecutively calculated on the basis of an output rotating speed detected by the first sensor 55 and an input rotating speed detected by the second sensor 56. The predetermined intermediate speed ratio ($e_m$) corresponds to where the transmission ends of the line (a) and the line (b) rotate at an equal speed. (Point (M) in FIG. 2a) In this low speed mode the input side and the output side are communicated with each other through the transmission line (a) passing between the input/output ends 1 and 2, thereby transmitting power from the engine 19 to the output shaft 18 through the line (a).

In this situation, the pump motor 7 functions as a motor whereas the pump motor 8 functions as a pump. The torque of the third input/output end 3 is transmitted to the output shaft 18 through a fluid transmission main (A) passing between the pump motors 7 and 8. In the low speed mode the displacement in the pump motor 8 is increased as indicated by the line (F) in FIG. 2(b), and after the displacement reaches the maximum capacity, the other pump motor 8 has a progressively reducing capacity as indicated by the line G. In this way the rotating speed of the output shaft 18 increases for the rotation of the input shaft 25. The two-dots lines (H) in FIG. 2(b) indicates a theoretical value which is presumably obtained if an ideal pump motor having no leakage loss is employed. However, when pump motors 7 and 8 for everyday use are employed, the displacement is controlled in accordance with characteristic curves (F) and (G) deviated from the theoretical values. This means that it is preferable to give the pump motors 7 and 8 a little larger capacity when they are employed as pumps whereas when they are employed as motors, it is necessary to give them a little smaller capacity than the theoretical value. When the modes are to be shifted, it is necessary to compensate for a loss resulting from leakage, and the compensation is performed by the pump motor 7.

The displacements of the pump motors 7 and 8 are controlled by sending a signal to the actuuators 44 and 45 such that the desired rotating speed and the actual rotating speed of the engine 19 detected by the sensor 56 are equal to each other, wherein the desired rotating speed corresponds to the amount of fuel supply to the engine. The desired rotating speed corresponds to a speed at which the gas mileage is highest in each amount of operating the accelerator. These values are previously calculated by tests, and stored in a table in the memory 53. An appropriate desired rotating speed is selected depending upon the amount of fuel supply to the engine which is input to the computer. In the low speed mode when the speed ratio reaches the intermediate predetermined speed ratio ($e_m$), and when the clutches 14 and 15 rotate at an equal speed (Point (M) in FIG. 2a), the second clutch 15 is engaged, and the first clutch 14 is disengaged, thereby shifting the mode of power transmission into the high speed mode.

In the high speed mode the mechanical transmission line (b) is concluded between the first input/output end 1 and the third input/output end 3, thereby transmitting power to the output shaft 18 therethrough. At this stage the pump motor 7 functions as a pump, whereas the other pump motor 8 functions as a motor. In this way the torque of the second input/output end 2 is transmitted to the output shaft 18 through the fluid transmission main (B) concluded between the pump motors 7 and 8. In the high speed mode the displacement in the pump motor 7 gradually increases as indicated by the dotted lines (G) in FIG. 2b. After the displacement becomes full, the displacement of another pump motor 8 decreases as indicated by the substantial line (F). In this way the rotating speed of the output shaft 18 increases for the input shaft 25.

The displacements of the pump motors 7 and 8 are controlled by sending a signal to the actuators 44 and 45 such that the desired rotating speed and the actual rotating speed of the engine 19 detected by the sensor 56 are equal to each other, wherein the desired rotating speed corresponds to the amount of fuel supply to the engine through the accelerator. In the high speed mode (Step 61 in FIG. 3), when the ratio of rotating speed reaches the maximum desired speed ratio $e_T$ and exceeds the value $e_{TL}$ (Step 62 in FIG. 3), the displacement of the pump motor 8 is controlled so that the mode is shifted into the top-lock-up mode (Step 63 in FIG. 3) to enable the ratio of rotating speed to settle at the ratio $e_T$. Under this situation, it is realized that the pump motor 8 has no allowance for displacement, the other pump motor 7 is reversely rotated, and the shaft 7a thereof becomes locked. The reason why the shaft 7a is locked after its reverse rotation, is that the ratchet 37 easily comes into engagement with the ratchet wheel 36. Subsequetly the mode is shifted into the top-lock-up mode where there exists no pressure difference between the fluid transmission mains (A) and (B), as indicated by Step 64 in FIG. 3. This mode shifting is effected by operating the actuators 45 such that the values detected by the pressure sensors 57 and 58 provided in the fluid circuits 31a and 31b become equal.

In the top-lock-up mode, if the balance between the desired rotating speed an the actual rotating speed of the engine 19 detected by the sensor 56 exceeds a given width ($\alpha$) (Step 65 in FIG. 3) the lock-up clutch 35 is disengaged, thereby shifting the top-lock-up mode into the high speed mode (Step 66 in FIG. 3). There are two cases where the rotating speed exceeds the given width ($\alpha$); one case is where the amount of fuel supply to the engine through the accelerator is increased by the operator (or driver), and the other is where an increased load reduces the rotating speed. In the latter case, it is necessary to reduce a load possible acting on the engine 19. To achieve this, the lock-up mode in the fluid transmission main (B) is shifted into the high speed mode.

The low speed mode and the high speed mode can be shifted from one to the other on the basis of a difference in the speed ratios or a difference in the rotating speeds between the clutches 14 and 15 or a difference between the desired rotating speed and the actual rotating speed of the engine. This feasibility increases the output rotating speed against the input rotating speed, and in the high speed area where an increase in the output reaches the upper limit, the normal stepless speed reduction is stopped, and power is transmitted only through the mechanical transmission line (b) for high speed. Once this top-lock-up mode is reached, the mode is not shifted into the high speed mode so long as the difference between the desired rotating speed and the actual rotating speed remains below ($\alpha$). The lock-up clutch 35 is protected against frequent on-off operations even if it is used at the neighborhood of the predetermined speed ratio $e_{TL}$. This ensures a prolonged life of the clutch 35 and the actuator 46.

Figure 2C:
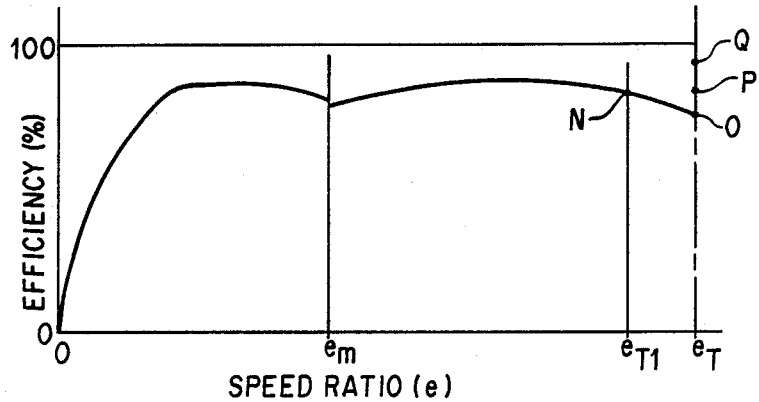

In addition, the top-lock-up mode locks the input/output shaft 7a of the pump motor 7, and controls the displacement of the pump motor 8 so that no pressure difference between the circuits 31a and 31b is achieved to negate the transmission ratio in the fluid transmission main (B). In this way the power is transmitted only through the mechanical transmission line (b) for high speed. As shown in FIG. 2c the efficiency in power transmission is constantly maintained throughout the operation. The pump motor 7 is stopped, and the other pump motor 8 is controlled, thereby avoiding the generation of heat and noise. In addition, a possible power loss due to leakage in the pump motors 7 and 8 is minimized, thereby reducing a possible torque loss. This saves energy in the fluid transmission mains (A) and (B), thereby securing an efficient power transmission. As a result, if there occurs any difference between the desired rotating speed and the actual rotating speed of the engine 19, the power transmission is nevertheless constantly performed with an increased gas mileage. The more frequently the fluid transmission mains (A) nad (B) have no pressure difference therebetween, the longer period of use the pump motors 7 and 8 can withstand.

In FIG. 2a, 2b and 2c the point (N) indicates the state in which the speed ratio (e) reaches a predetermined value ($e_{TL}$), the point (O) indicates a point of time when the speed ratio (e) becomes the predetermined maximum speed ratio ($e_T$), the point (P) indicates a stage at which the pressure difference becomes zero after the shaft 7a of the pump motor 7 for low speed is locked, and the point (Q) indicates a state in which the pump motor 8 for high speed becomes disengaged and a possible torque loss is avoided.

The illustrated embodiment employs a planetary gearing, but a bevel gearing can be effectively used.

The power transmission is stopped by means of the pawl clutches described above, but it can be stopped by means of a braking band or a synchromesh clutch. The braking band is wound around a brake drum fixed to the input/output shaft of the pump motor 7 for low speed, and the braking band is tightened or slackened by an actuator, thereby braking the drum. In the case of a synchromesh clutch a dog gear is fixed to the input/output shaft of the pump motor 7 for low speed, wherein the dog gear has a conical surface. A hub having splines on its periphery is fixed coaxially of the dog gear, and a synchronizing ring is fitted around the conical surface of the clutch. A sleeve is slidably engaged with the splines. The hub is equipped with a synchronizing key, which freely fits in a groove produced in the synchronizing ring. The key is put into synchronous operation so as to enable the sleeve to be engaged with the dog gear.

One advantage results from the employment of other clutch systems than the claw types described above is that in locking one pump motor, it is not necessary to control the displacemet of the other pump motor until the latter is reversely rotated.

The power transmission is also stopped by a combined use of the restraining means described above and a releaser whereby the pump motor for high speed is disengaged from the mechanical transmission line. For example, the restraining means includes a dry or wet type multi-planar clutch or a synchromesh clutch can be employed.

In addition to the restraining means described above, a means can be employed for minimizing a torque loss likely to occur when the pump motor for high speed is in the idling operation. The means of this kind is disclosed in Japanese patent application No. 61(1986)-16057. The known device includes a housing having a tapered inside surface instead of the pump motor 8 for high speed, a pintle having an axis in parallel with that of the housing and a tapered surface around its top end, a cylinder barrel rotatively engaging with the tapered surface and being eccentrically located in the housing together with the pintle, a plurality of pistons radially and projectably provided in the cylinder barrel, and a ring provided concentrically of the housing, the periphery of the ring being kept in contact with the tapered wall of the housing, and the inside surface thereof being kept in contact with the pistons, the ring and the cylinder barrel being synchronously rotated. The rotation causes the pistons to move up and down periodically, thereby enabling them to function as a pump or a motor. In this case the displacement of the pump motor 8 can be adjusted by sliding the pintle to vary the eccentric position of the cylinder barrel. The pump motor 8 is provided with the torque loss restraining means, which has the ring displaceably arranged with respect to the axis of the housing. There is provided a pressure pocket between the top portion of the ring and the inside surface of the housing positioned opposedly to the ring, the pocket being connected to the inlet of a pilot pressure. In the top-lock-up mode a pilot pressure is introduced into the inlet. In response to the pilot pressure the ring is axially displaced, and becomes separated from the housing, thereby reducing frictional resistance sufficiently to minimize the torque loss due to idling. Another torque loss restraining means is disclosed in Japanese patent application No. 61(1986)-160577, which basically has the same structuure described above, with the only difference that in response to the pilot pressure the cylinder barrel is caused to rise above the pintle, thereby reducing frictional resistaze likely to occur when idling.

Several forms of clutch means and torque loss restraining means have been described for stopping the power transmission. They are commonly advantageous in that an energy loss is prevented from occurring when the pump motors are idling.

The fluid transmission mechanisms are not limited to the embodiments described above, but it should be understood that other form, modifications and refinements are possible within the scope of the present invention.

What is claimed is:

1. A stepless speed reducer comprising:
   a differential gear unit including a first mechanical power transmission line for low speed and a second mechanical power transmission line for high speed, the two lines being in parallel with each other;
   a fluid transmission main concluded by a pair of pump motors each provided in the respective power transmission lines, wherein one pump motor is for low speed, and the other is for high speed;
   a first clutch for keeping the end of the first power transmission line for low speed into or out of engagement with a rotary power transmitter;
   a second clutch for keeping the end of the second power transmission line for high speed into or out of engagement with the rotary power transmitter, wherein a low speed mode is selected when the ratio of output rotating speed to input rotating speed is smaller than an intermediate speed ratio at which the two clutches rotate at an equal speed, thereby keeping the first clutch into engagement with the power transmitter, and a high speed mode is selected when the ratio is larger than the intermediate speed ratio, thereby keeping the second clutch into engagement with the power transmitter;
   means for controlling the displacement of the pump motor for high speed to increase the speed ratio so as to reach a maximum desired speed ratio at which the pump motor for low speeds stops when the speed ratio nears the maximum desired speed ratio;
   a power distribution stop means including a locking means for preventing the shaft of the pump motor for low speed from rotation while the operation at the maximum desired speed ratio is maintained; and
   a compensating means for controlling a displacement of the pump motor for high speed so that no pressure difference exists between two power transmission circuits while the operation at the maximum desired speed ratio is maintained.

2. A stepless speed reducer as defined in claim 1, wherein the locking means comprises a braking band.

3. A stepless speed reducer as defined in claim 1, wherein the locking means comprises a ratchet wheel and a ratchet engageable with the ratchet wheel, thereby locking the ratchet wheel from rotating in one direction.

4. A stepless speed reducer as defined in claim 1, wherein the locking means comprises a synchromesh clutch.

5. A stepless speed reducer as defined in any one of claims 1 to 4, wherein the power distribution stop means further comprises a releaser whereby the pump motor for high speed is mechanically disengaged from the mechanical power transmission line.

* * * * *

UNITED STATES PATENT AND TRADEMARK OFFICE
CERTIFICATE OF CORRECTION

PATENT NO. : 4,895,049

DATED : January 23, 1990

INVENTOR(S) : Yasuo KITA et al

It is certified that error appears in the above-identified patent and that said Letters Patent is hereby corrected as shown below:

On the cover page, Item [30], please delete "Jul. 31, 1987 [JP] Japan 62-335665 --, and insert therefor --
Jul. 31, 1987 [JP]   Japan . . . . . . . . . . 62-193504
Dec. 31, 1987 [JP]   Japan . . . . . . . . . . 62-335655 --.

Signed and Sealed this

Thirteenth Day of April, 1993

Attest:

STEPHEN G. KUNIN

*Attesting Officer*        *Acting Commissioner of Patents and Trademarks*